United States Patent [19]
Ruf

[11] Patent Number: 5,158,388
[45] Date of Patent: Oct. 27, 1992

[54] ARRANGEMENT FOR THE JOINTED CONNECTION OF A MOVEABLE FLOW CONTROL ELEMENT WITH A SUPPORT ELEMENT

[75] Inventor: Wolfgang Ruf, Heidenheim, Fed. Rep. of Germany

[73] Assignee: J.M.Voith GmbH, Heidenheim, Fed. Rep. of Germany

[21] Appl. No.: 792,722

[22] Filed: Nov. 15, 1991

[30] Foreign Application Priority Data

Nov. 28, 1990 [DE] Fed. Rep. of Germany ....... 4037774

[51] Int. Cl.$^5$ .............................................. F16D 1/00
[52] U.S. Cl. ..................................... 403/24; 403/220; 403/341
[58] Field of Search .................. 403/220, 224, 341, 24

[56] References Cited

U.S. PATENT DOCUMENTS

| 2,080,627 | 5/1937 | Morgan | 403/220 X |
|---|---|---|---|
| 2,587,822 | 3/1952 | Corning | 403/220 |
| 2,732,005 | 1/1956 | Corning | 403/220 X |
| 4,047,824 | 9/1977 | Brokmann et al. | 403/341 X |
| 4,133,715 | 1/1979 | Hergert | 161/341 |
| 4,617,091 | 10/1986 | Rodal et al. | 162/343 |
| 4,869,552 | 9/1989 | Tolleson et al. | 403/220 X |

FOREIGN PATENT DOCUMENTS

1451644  7/1966  France ................ 403/220

Primary Examiner—Andrew V. Kundrat
Attorney, Agent, or Firm—Baker & Daniels

[57] ABSTRACT

In this arrangement, each of two elements, namely a support element and a flow control element forms on at least one of its two outsides part of a flow control surface. A joint element couples the flow control element movably to the support element and is arranged at a distance behind the flow control surfaces. The support element and the flow control element have in the area of the joint element, end faces that face each other. These define a space which is filled up by a soft and elastic filler piece.

16 Claims, 3 Drawing Sheets

ARRANGEMENT FOR THE JOINTED CONNECTION OF A MOVEABLE FLOW CONTROL ELEMENT WITH A SUPPORT ELEMENT

BACKGROUND OF THE INVENTION

The invention concerns an arrangement for the jointed connection of a movable flow control element with a support element carrying it.

Arrangements of this type are found in many different fields of fluidics. The following are named examples:

1. Paper machine headbox in the flow channel of which a movable separating lamella is arranged or whose flow channel is limited by a movable control flap.
2. Airplane wings with movable flaps on the front or rear edges.
3. Rudder or adjustable hydrofoil on watercraft.

Known from the U.S. Pat. No. 4,617,091 is a paper machine headbox in the flow channel of which moveable separating lamellae are arranged. Each separating lamella features on its upstream end a bead (with predominantly round cross section) by which the separating lamella is pivotably mounted in a dovetail groove. This dovetail groove is provided on the downstream side of a perforated plate, also called flow grate. A jointed connection of that type has the disadvantage that gaps or slits exist in which dirt or fiber residue can accumulate. There is a risk that fiber accumulations separate now and then and proceed as lumps on the forming paper web, thereby adulterating the paper quality. Besides, there is the additional risk of increased friction and premature wear of the joint element.

According to U.S. Pat. No. 4,133,715, the separating lamella is subdivided in an upstream, highly elastic part and a downstream, less elastic part. The two parts, in turn, are connected with each other by a joint that has the same disadvantages as the aforementioned joint. A further disadvantage of this joint is constituted by forming in the flow control surfaces on both sides an unsteadiness which interferes with the flow.

The problem underlying the invention is to provide an arrangement for the jointed connection of a movable flow control element with a backing element where the gaps or slits (that may lead to dirt accumulations) are avoided. Additionally, the design of the arrangement is to be such that an undisturbed flow pattern will be assured.

SUMMARY OF THE INVENTION

This problem is solved by the features of the present invention. In an arrangement for the jointed connection of a movable flow control element which is supported by a support element, each of the two elements forms on at least one of its two outside surfaces part of a flow control surface. A joint element couples the flow control element movably to the support element. The joint element is arranged at a distance behind the flow control surface or behind both flow control surfaces. The support element and the flow control element have end faces in the area of the joint element that face each other and define a space. The space is occupied by a soft and elastic filler piece covering the joint element, the outside of which filler piece forms part of the flow control surface or parts of the two flow control surfaces, so that the flow control surfaces extend steadily from the support element via the filler part to the flow control element.

These, in other words, express the following: When viewing the jointed connection in a view upon the flow control surface, the joint element is not recognizable at all; for it is, so to speak, "hidden" behind the soft and elastic filler piece. To provide the space necessary for the elastic filler, the joint element is arranged at a distance behind the flow control surface, wherein the support element and the flow control element form the end faces that face each other and have a certain distance from each other, thus defining said space which is filled by the said elastic filler piece. The latter is favorably formed by pouring an initially liquid or doughy substance into the space, whereafter this substance cures but remains soft and elastic after curing. In this or similar methods of introducing the elastic filler section it causes no problems to so shape the outside of the filler section that the flow control surface can be given a pattern that is steady and thus favorable in terms of flow, from the support element via the filler section to the flow control element.

The invention is applicable in various technical fields, of which some were mentioned as examples initially. The arrangement can be so made that the support element and the flow control element feature a flow control surface only on one side, for instance when they form an outer flow control wall of a paper machine headbox. In this case, an advantage of the inventional jointing is constituted by the fact that it is absolutely liquid tight.

However, the invention is primarily applicable when the support element and the flow control element are arranged within a flowing medium, so that they form flow control surfaces on both sides. The support element and the flow control element define spaces in the area of both flow control surfaces, with their end faces facing each other, each space being filled by a soft, elastic filler part.

DESCRIPTION OF THE PREFERRED EMBODIMENT

Figure 1:
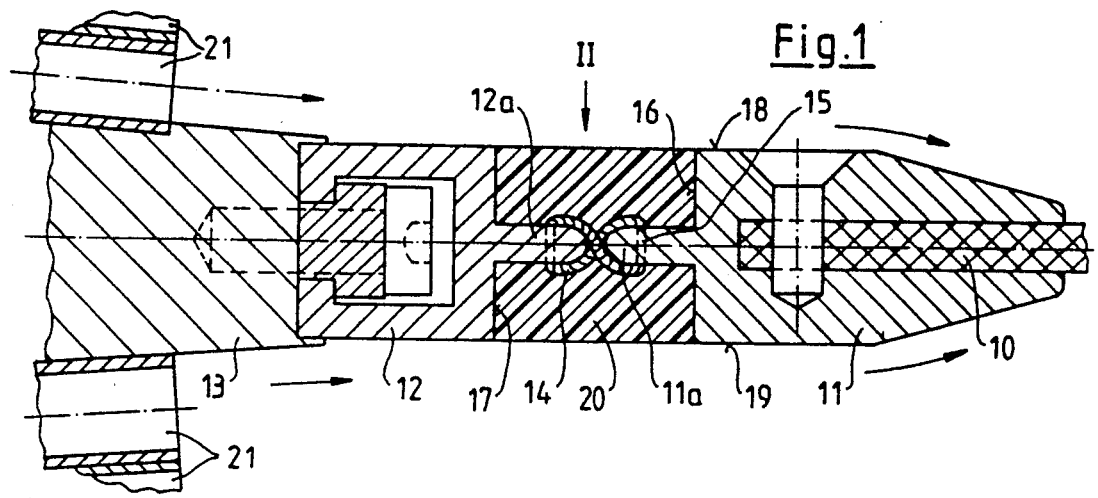
FIG. 1 shows a partial longitudinal section of the arrangement for the jointed connection of a movable separating lamella of a paper machine headbox with a stationary component of the headbox.

In FIG. 1, a movable separating lamella 10 is mounted in a holder bar 11 which is movable together with the separating lamella. The separating lamella and the holder bar 11 thus form together a movable flow control element. Also shown in FIG. 1 is a bar 12 with an approximately C-shaped cross section. This bar 12 is rigidly mounted on a stationary component 13 of the headbox and forms the support element carrying the flow control element 10, 11. During operation, paper substance flows from the turbulence pipes 21 and along the flow control surfaces 18, 19. The other known elements of the headbox have been omitted. It is understood that the said components 10 through 13, perpendicular to the drawing plane, extend transverse through the interior of the headbox, i.e., transverse to the machine direction of the paper machine.

The flow control element 10, 11 is movably coupled to the support element 12 by means of a joint element 14. The latter is fashioned as a thread or rope laced crosswise. For this purpose, the movable holder bar 11 has in the area of the center plane a rib 11a. Similarly, the C-shaped bar 12 has a rib 12a. Provided in both ribs are bores 15 through which the thread 14 is passed; refer also to FIG. 2.

Figure 2:
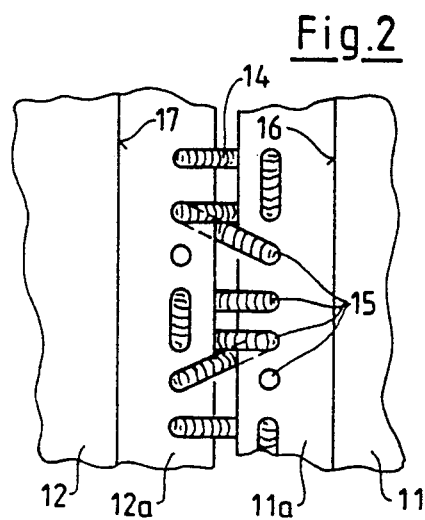
FIG. 2 is a partial view in the direction of arrow II in FIG. 1.

From the described design it follows that the joint element 14 is arranged at a distance behind both flow control surfaces 18 and 19. Additionally, both the support element 12 and the flow control element 10, 11 feature end faces 16 and 17 that face each other while defining a space, and at that, on both sides of the joint element 14. Both spaces are taken up by a filler piece 20 which is formed of a soft and elastic material, preferably by casting in liquid condition and subsequent curing. Each of the two outsides of the filler piece 20 forms a part of the flow control surface 18 or 19. Attention was paid that the flow control surface extends steadily from the support element 12 via the filler piece 20 to the flow control element 10, 11. In FIG. 2, the filler piece 20 has been omitted.

Figure 3:
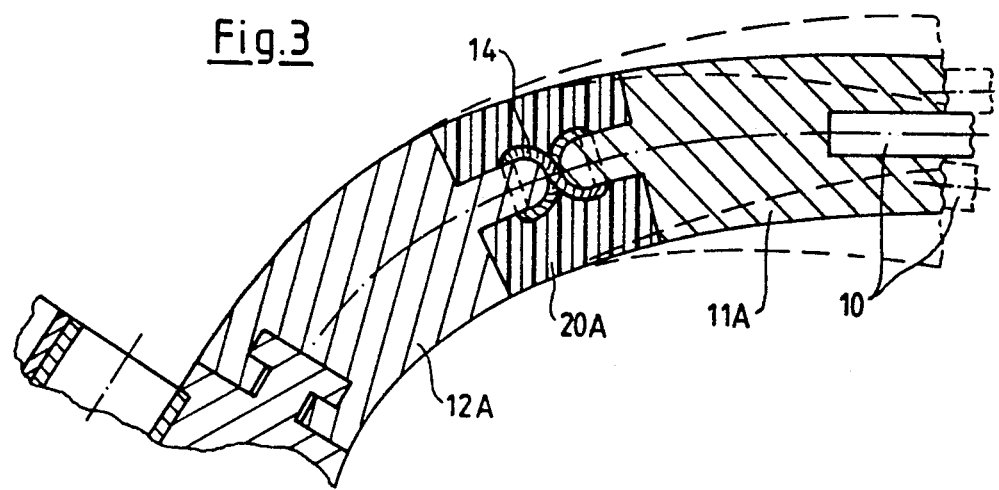
FIGS. 3 and 4 are partial longitudinal sections of arrangements modified relative to FIG. 1.

The embodiment illustrated in FIG. 3 differs from the one described above essentially in that the support element 12A, the two filler pieces 20A and the holder bar 11A are so shaped that they form curved flow control surfaces and thus serve at the same time for flow deviation in the paper machine headbox. Broken lines indicate how the separating lamella 1 is during operation allowed to freely swing up and down in the flow.

Figure 4:
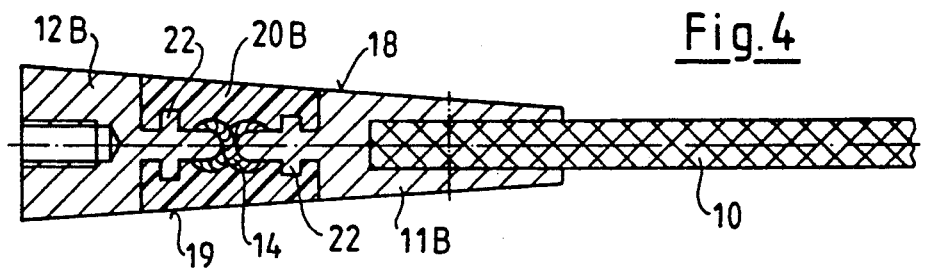
Figure 5:
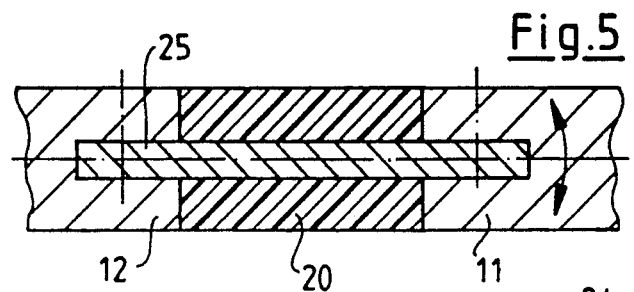
FIGS. 5-8 are as well partial longitudinal sections and show designs of the joint element that vary from FIGS. 1-4.
Figure 6:
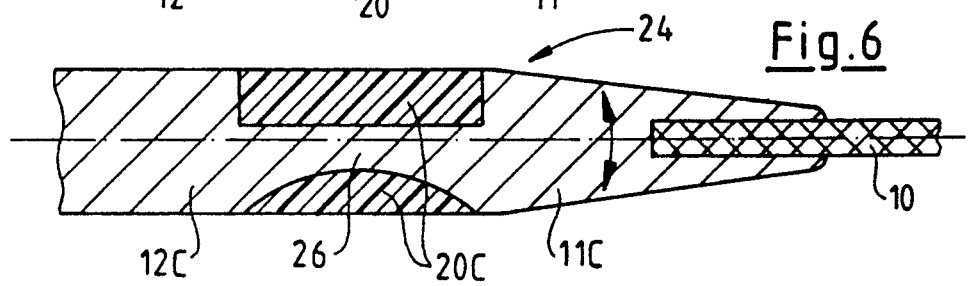

The embodiment illustrated in FIG. 4 differs from the ones described above essentially only in that the two flow control surfaces 18, 19—formed again by the support element 12B, the filler pieces 20B and the holder bar 11B of the lamella 10—converge in flow direction. Also illustrated are cams 22 which promote the establishment of a formfit connection between the filler section 20B and the elements 11B, 12B.

FIGS. 5-9 show that there are several design options for the joint element. According to FIG. 5, the joint element is formed by a leaf spring 25 comprised of, for instance, steel or plastic. According to FIG. 6, the holder bar 11C of the separating lamella 10 and the support element 12C form an integral component 24 which at the point of the joint features a thin spot 26 that is sufficiently soft to bend. This spot is formed in that either from one side or, as illustrated, from both sides a groove is machined in, the cross section of which, e.g., is a rectangle or a circular segment. Again, the grooves are filled up each by a soft and elastic piece 20C.

Figure 7:
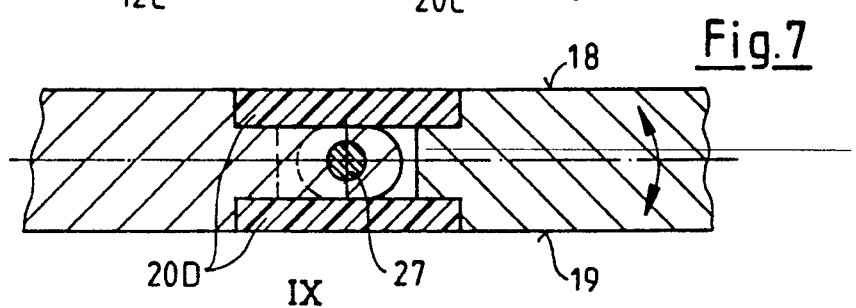

FIG. 7 shows an embodiment whose joint element is fashioned as a conventional hinge 27. As with the embodiments described above, also this joint element is arranged at a distance behind both flow control surfaces 18, 19, creating again two spaces which are taken up each by a soft and elastic filler piece 20D that covers the hinge.

Figure 8:
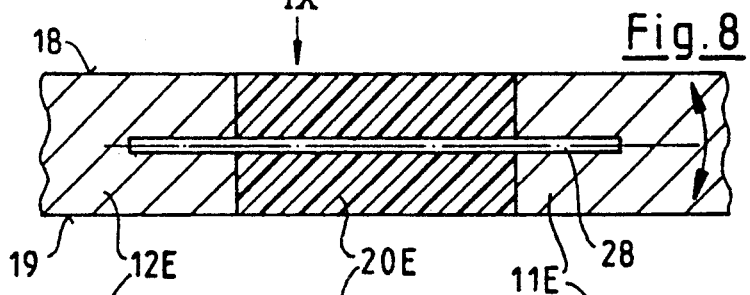
Figure 9:
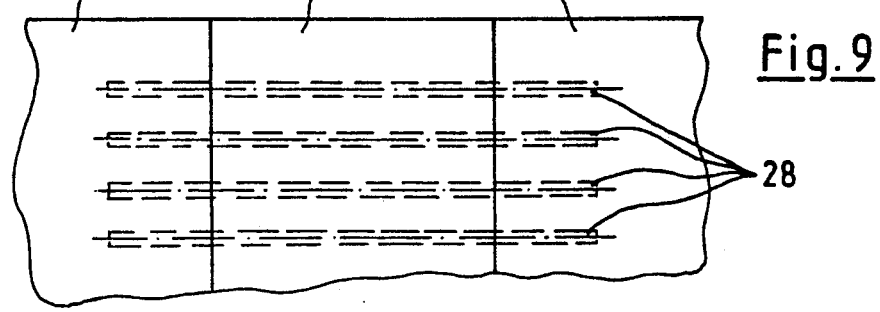
FIG. 9 is a view in the direction of arrow IX in FIG. 8.

According to FIGS. 8 and 9, the joint element is formed by several spring bars 28, which are arranged in a row extending transverse to the flow direction, i.e., transverse to the machine direction of the paper machine. Each of the spring bars 28, for one, is inserted in the flow control element 11E and, for another, in the support element 12E. The flow control element and the support element again have facing end faces that define a space which again is taken up by a soft and elastic filler piece 20A. Here, too, the filler piece forms parts of two flow control surfaces 18, 19 with a steady pattern.

Figure 10:
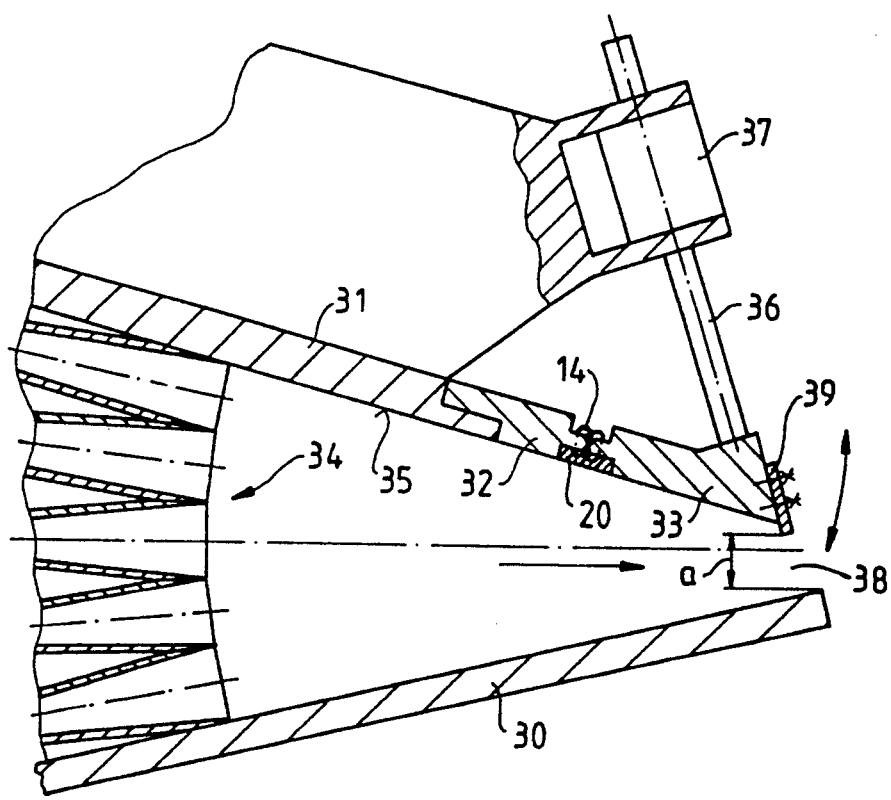
FIG. 10 is a schematic partial longitudinal section of a headbox with movable control flap.

FIG. 10 shows a paper machine headbox an immovable lower flow control wall 30 and an upper flow control wall composed of the parts 31, 32 and 33, and in between a turbulence pipe insert 34. The parts 31 and 32 of the upper flow control wall are immovable as well, whereas part 33 is fashioned as a movable control flap which by means of a joint element 14, similar to FIG. 1, is coupled to the immovable part 32. The inside of the joint element 14 again is covered by means of a filler piece 20, so that the flow control surface 35 extends steadily from the parts 31 and 32 via the filler part 20 to the control flap 33. In variation from FIG. 10, also the outside of the joint element 14 could be covered by a filler piece, for instance to avoid dirt deposits.

The joint element 14 is preferably designed as a crosswise laced rope or as a row of spring bars as described above. This makes the control flap adjustable across an angular range greater than with conventional control flaps that are connected with the flow control wall following upstream, by a flexible thin spot. This yields the following additional advantage, in conjunction with a row of numerous actuator spindles 36 which, narrowly spaced, are distributed across the machine width, and with a spindle drive 37 each which is rigidly connected with the immovable part 31 of the upper flow control wall: The clearance of the discharge gap 38 can be adjusted uniformly across the machine width, by simultaneous actuation of all spindles 36. In the past is has been necessary for that purpose to couple a large section of the upper flow control wall by means of a hinge to the headbox housing and move them by means of additional displacement devices in the desired position. In FIG. 10, additionally, the clearance of the discharge gap can be adjusted locally, i.e. in a specific narrow zone of the machine width, by actuation of a single spindle or of a few adjacent spindles 36, for correction of the basis weight cross profile of the paper web to be manufactured. In FIG. 10, the clearance gap width a is determined by a profile bar 39 which is rigidly mounted on the control flap 33; but this profile bar may also be omitted.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An arrangement for the jointed connection of a movable flow control element with a support element for said flow control element, each of said flow control element and said support element having two outside surfaces and forming a flow control surface on at least one of said surfaces, said arrangement comprising:

a joint element for movably coupling said flow control element to said support element, said joint element being positioned at a distance behind the flow control surface or behind both flow control surfaces; said support element and said flow control element each having end faces, said end faces being aligned so that they face each other and define a space therebetween; and a filler piece filling said space, said filler piece being formed of a soft and elastic material and being situated so that said filler piece covers said joint element, said filler piece having an outside surface, said outside surface forming a portion of said flow control surface so that said flow control surface extends continuously from said support element via said filler part to said flow control element.

2. The arrangement of claim 1, wherein said support element and said flow control element are arranged within a flowing medium so that on two opposite sides they form parts of two flow control surfaces, said support element and said flow control element defining respective spaces in the area of each flow control surfaces, with said end faces facing each other, wherein each of said spaces is filled by a soft, elastic filler piece.

3. The arrangement of claim 1, wherein said joint element comprises a crosswise laced rope or band.

4. The arrangement of claim 1, wherein said joint element comprises a leaf spring.

5. The arrangement of claim 4, wherein said leaf spring is formed from one of metal and plastic.

6. The arrangement of claim 1, wherein said joint element comprises a row of spring bars.

7. The arrangement of claim 1, characterized in that said joint element comprises a hinge.

8. The arrangement of claim 1, in which said joint element comprises a thin spot, said thin spot being sufficiently soft so that it is bendable, and wherein an integral component is formed by said support elements and said flow control element.

9. The arrangement of claim 1, in which said joint element comprises a thin spot, said thin spot being sufficiently soft so that it is bendable, and wherein an integral component is formed by said support element and a holder bar for a separating lamella.

10. The arrangement of claim 1, wherein on said support element and on said flow control element, between the end face and joint element, there are ribs provided for establishing a formfit connection with said filler piece.

11. The arrangement of claim 1, wherein on said support element or on said flow control element, between the end face and joint element, there are ribs provided for establishing a formfit connection with said filler piece.

12. The arrangement of claim 1, wherein on said support element and on said flow control element, between the end face and joint element, there are cams provided for establishing a formfit connection with said filler piece.

13. The arrangement of claim 1, wherein on said support element or on said flow control element, between the end face and joint element, there are cams provided for establishing a formfit connection with said filler piece.

14. In an arrangement for the jointed connection of a movable flow control element with a support element for said flow control element, each of said flow control element and said support element having two outside surfaces and forming a flow control surface on at least one of said surfaces, a joint element for movably coupling said flow control element to said support element, said joint element being positioned at a distance behind the flow control surface or behind both flow control surfaces, said support element and said flow control element each having end faces, said end faces being aligned so that they face each other and define a space therebetween; and a filler piece filling said space, said filler piece being formed of a soft and elastic material and being situated so that said filler piece covers said joint element, said filler piece having an outside surface, said outside surface forming a portion of said flow control surface so that said flow control surface extends continuously from said support element via said filler part to said flow control element.

15. An arrangement for the jointed connection of a movable flow control element with a support element for said flow control element, each of said flow control element and said support element having two outside surfaces and forming a flow control surface on at least one of said surfaces, said arrangement comprising:

a joint element for movably coupling said flow control element to said support element, said joint element being positioned at a distance behind the flow control surface or behind both flow control surfaces; said support element and said flow control element each having end faces, said end faces being aligned so that they face each other and define a space therebetween, said joint element comprising a crosswise laced rope or band; and a filler piece filling said space, said filler piece being formed of a soft and elastic material and being situated so that said filler piece covers said joint element, said filler piece having an outside surface, said outside surface forming a portion of said flow control surface so that said flow control surface extends continuously from said support element via said filler part to said flow control element.

16. The arrangement of claim 6, wherein said spring bars are one of metal, plastic or like composition.

* * * * *